United States Patent [19]

Corain et al.

[11] Patent Number: 4,957,403

[45] Date of Patent: Sep. 18, 1990

[54] DEMOUNTABLE PIN FOR ROTATABLY CONNECTING TOGETHER TWO ELEMENTS OF SMALL AXIAL DIMENSION, PARTICULARLY SUITABLE FOR THE LEVER MECHANISMS OF TEXTILE MACHINES

[75] Inventors: Luciano Corain; Gianni Maitan, both of Vicenza, Italy

[73] Assignee: Nuovopignone - Industrie Meccaniche e Fonderia S.p.A., Florence, Italy

[21] Appl. No.: 249,658

[22] Filed: Sep. 27, 1988

[30] Foreign Application Priority Data

Oct. 2, 1987 [IT] Italy ............................. 22118 A/87

[51] Int. Cl.$^5$ .................. F16B 33/00; F16B 43/02
[52] U.S. Cl. ..................... 411/368; 411/544; 411/916; 411/943; 267/162
[58] Field of Search .............. 411/10, 11, 366, 368, 411/369, 371, 544, 916, 943; 267/161, 162

[56] References Cited

U.S. PATENT DOCUMENTS

| | | | |
|---|---|---|---|
| 2,675,225 | 4/1954 | Migny | 267/162 |
| 3,476,009 | 11/1969 | Markey | 411/11 |
| 4,006,661 | 2/1977 | Sims, Jr. | 411/11 |
| 4,770,584 | 9/1988 | Vinciguerra | 411/366 |

FOREIGN PATENT DOCUMENTS 52-63547  5/1977  Japan ........................... 411/11

Primary Examiner—Neill R. Wilson
Attorney, Agent, or Firm—Birch, Stewart, Kolasch & Birch

[57] ABSTRACT

A demountable pin for rotatably connecting together two elements of small axial dimension, consisting of a bolt with a frusto-conical under-head and an inner hexagonal through bore for tightening it by a key. The pin is locked between two frusto-conical flares of the elements by an end nut with a frusto-conical under-head and a washer with a frusto-conical surface of greater taper than the flares. The under-heads of the nut and the bolt cooperate with the flares.

5 Claims, 3 Drawing Sheets

DEMOUNTABLE PIN FOR ROTATABLY CONNECTING TOGETHER TWO ELEMENTS OF SMALL AXIAL DIMENSION, PARTICULARLY SUITABLE FOR THE LEVER MECHANISMS OF TEXTILE MACHINES

This invention relates to a demountable pin which is simply and economically constructed and which can easily, reliably and accurately be installed. Although the pin has a very small axial dimension, it can during its tightening, store adequate and sufficient elastic energy to support high alternating loads with absolute safety from slackening or misalignment. Therefore, the pin is particularly suitable for rotatable connections within the lever mechanisms of textile machines.

More specifically, the invention relates to a further improvement in the demountable pin described in the previous U.S. patent application Ser. No. 028,207 filed by the present Applicant on Mar. 20, 1987, now U.S. Pat. No. 4,770,584.

In this patent application, the demountable pin to be inserted and clamped between two frusto-conical flares formed by a pressing operation in one end of each of two opposing plate metal cheeks pertaining to a first element and within which an end of a second element is inserted for a rotatable connection thereto by way of a rotation bearing. The pin consists of a central stay bolt having an internal hexagonal through bore for tightening by a key, and having at its ends two external opposite threads, right handed and left handed respectively, which cooperate with the corresponding inner threads of two end nuts each consisting of an internally threaded, substantially cylindrical annular part which is provided externally, at one end, with an annular flange having a frusto-conical surface and a thickness which decreases in an outward direction, its taper being greater than the taper of said frusto-conical flares of the cheeks pertaining to said first element.

Although such a construction, because of its self-locking character, is excellent in its ability to fix without any danger of slackening even if large alternating stresses are present, it nonetheless has the drawback of not always allowing the pin to be easily and accurately remounted in position because of its central stay bolt. Because there is no abutment to act as a stop or locator, the pin is able to freely screw into one or other of its two end nuts embedded in the respective frusto-conical flares and can therefore be inadvertently locked by the operator in an uncentered position projecting from one side of said frusto-conical flares. Such mounting is intolerable and represents a very serious drawback particularly in the case of lever mechanisms of textile machines, in which the pin must always be completely contained within a small axial dimension in the order of 12 mm between the two opposing cheeks of said first element.

SUMMARY OF THE INVENTION

The object of the present invention is to obviate said drawback by providing a demountable pin which in addition to having a small axial dimension and providing considerable safety against slackening under the action of external loads, including large loads, has the advantage of being easy to accurately install on each remounting, without any possibility of error. This is substantially attained in that said central stay bolt of the pin is made rigid with an end nut to form a bolt with a frusto-conical under-head, this under-head being made to cooperate with a washer having a frusto-conical surface, the taper of which is greater than that of the frusto-conical flares between which the pin is to be clamped.

More specifically, the demountable pin to be inserted and clamped between two frusto-conical flares formed by a pressing operation in one end of each of two opposing plate metal cheeks pertaining to a first element and within which there is inserted an end of a second element to be rotatably connected thereto and which for this purpose comprises a rotation bearing in correspondence with the pin passage bore, said pin consisting of a bolt having a frusto-conical under-head and an internal hexagonal through bore for its tightening by a key, and cooperating with an end nut also having a frusto-conical under-head, the frusto-conical under-heads of both the bolt and nut having a taper substantially equal to that of said frusto-conical flares of said two cheeks of the first element, is characterised according to the present invention in that on said bolt and in cooperating relationship with the frusto-conical under-head thereof there is mounted a washer having a frusto-conical surface, the taper of which is greater than that of said frusto-conical flares of the cheeks pertaining to said first element. In this manner, the frusto-conical under-head of the bolt inserted into the corresponding flare acts as a stop and therefore keeps the bolt in position during its tightening, so preventing any escape of its shank, whereas the washer of frusto-conical surface, having a greater taper than the frusto-conical flare of the cheek in which it is to be inserted, is obliged to deflect during its tightening until it perfectly mates with the frusto-conical edges of said flare and of the bolt under-head. The frusto-conical under-head of the bolt thus undergoes elastic deformation and stores energy which, although deriving from a very small overall axial length in the order of 12 mm, has proved on experiment to be sufficient to support even large alternating loads without any slackening occurring in the connection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described in detail hereinafter with reference to the accompanying drawings which show a preferred embodiment thereof by way of non-limiting example in that technical, applicational or constructional modifications can be made thereto but without leaving the scope of the present invention. In this respect, it is apparent that the demountable pin is not only limited to connecting an element with facing cheeks to another element, but can be applied in any field in which large loads have to be supported in a small space without the danger of slackening.

In said drawings.

DETAILED DESCRIPTION OF THE PREFERRED EMBODIMENTS

Figure 1:
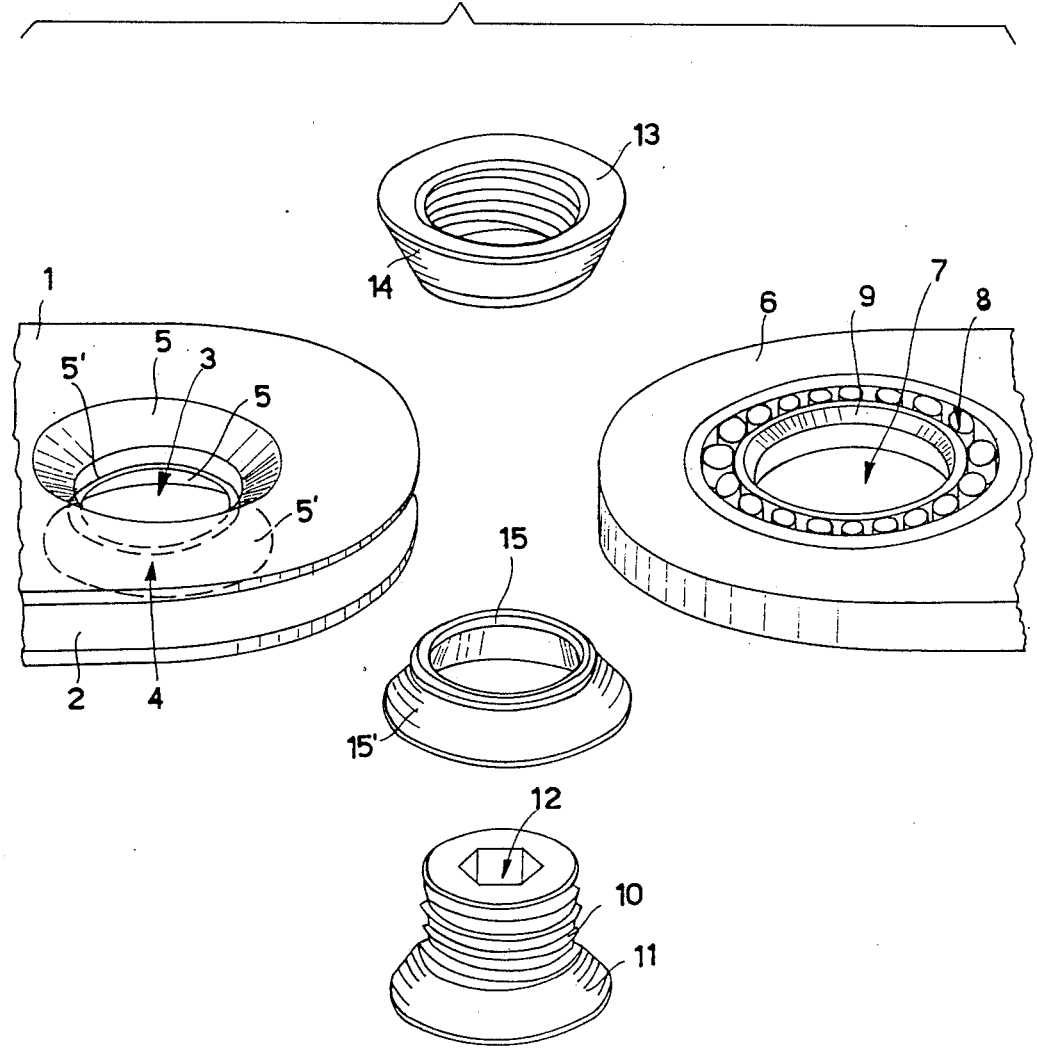
FIG. 1 is an exploded perspective view of the demountable pin according to the invention, used for rotatably connecting two elements together, one of which comprises two opposing cheeks.
Figure 2:
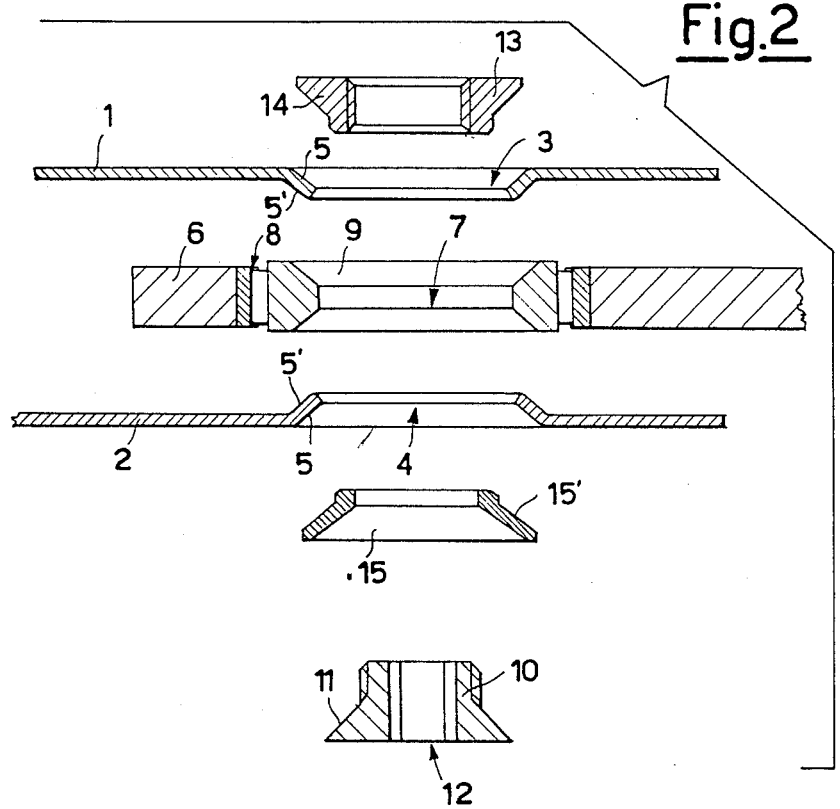
FIG. 2 is a sectional view of the system of FIG. 1 to a different scale, in a position ready for mounting.
Figure 3:
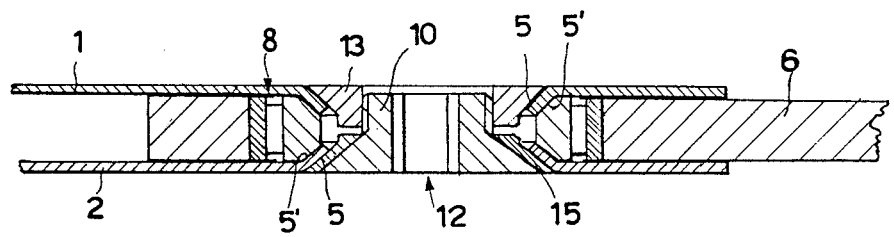
FIG. 3 is a section through the system of FIG. 2 in its mounted position.

In the figures, the reference numerals 1 and 2 indicate respectively the ends of two opposing plate metal cheeks pertaining to a first element and comprising two flares 3 and 4 respectively, formed by a pressing operation and having frusto-conical surfaces 5.

Between said cheeks 1 and 2 there is inserted the end of a second element 6 which is to be rotatably connected thereto and comprises in an appropriate hole 7 and a roller bearing 8 having an inner track 9 with a double frusto-conical surface to exactly mate with the outer faces 5' of the frusto-conical projections 5 of the flares 3 and 4.

The two elements 1-2 and 6 are clamped together by a pin passing through the holes 3, 4 and 7 and consisting of a bolt 10 having a frusto-conical under-head 11 with the same taper as the frusto-conical surfaces 5 of the flares 3 and 4 and a hexagonal inner bore 12 which enables it to be rotated from both ends by a key, to screw it into the end nut 13 which also has a frusto-conical under-head 14 similar to 11.

Figure 4:
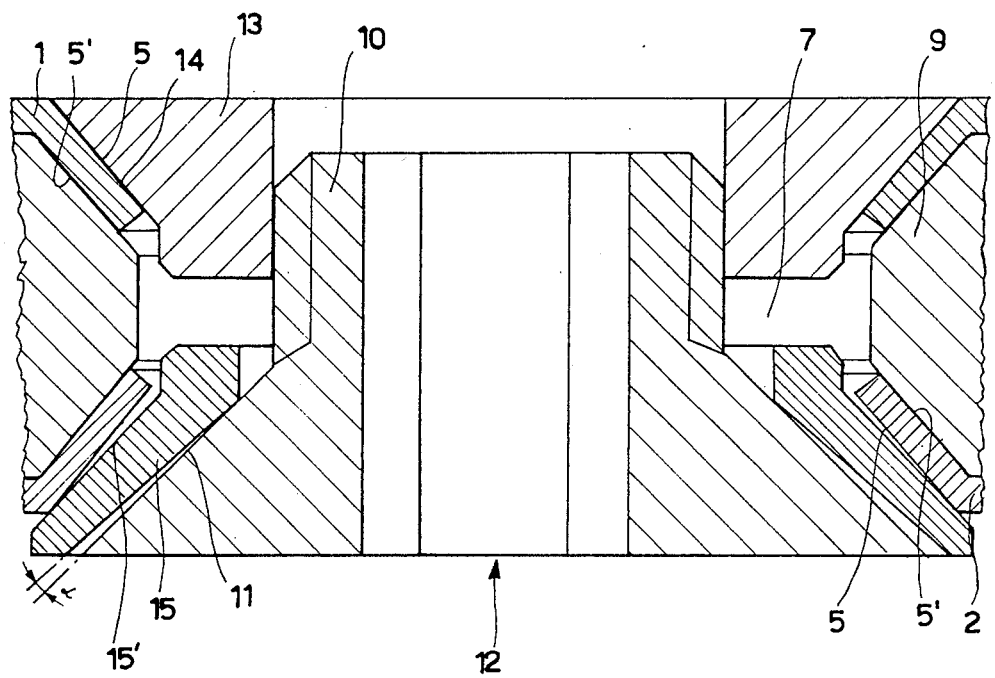
FIG. 4 is a section through a detail of FIG. 3 to an enlarged scale, showing the position of the washer of frusto-conical surface before its elastic deformation.

On said bolt 10 and in cooperating relationship with its under-head 11 there is mounted a washer 15 of high-strength pressed steel which comprises a frusto-conical surface 15' orientated as said under-head 11 but having a taper which exceeds by a certain angle α (see specifically FIG. 4) that of said under-heads 11 and 14 and thus that of the frusto-conical surfaces 5 of the flares 3 and 4.

In this manner, during tightening, said washer 15 is compelled to bend through an equal angle α, generally of about 2÷3 degrees, to thus deform elastically and mate with the frusto-conical surface 5 of the flare 4 and the under-head 11 of the bolt 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A demountable pin for insertion through and clamping together two frusto-conical flares sandwiching an element therebetween, each of said frusto-conical flares being formed in plate cheeks, said element being rotatably connected to said plate cheeks and having a pin passage and rotation bearing, said pin passage being aligned with said rotation bearing, said pin having a bolt with a frusto-conical under-head rigidly mounted thereto and an internal through bore, said pin being detachably affixed to an end nut after said pin is inserted through said two frusto-conical flares, said end nut also having a frusto-conical under-head, the frusto-conical under-heads of both the bolt and the nut having a taper substantially equal to a taper of said frusto-conical flares of said two cheeks, said frusto-conical under-head of said bolt being engaged with a washer having a frusto-conical surface when said pin is inserted through said two frusto-conical flares, the frusto-conical surface of said washer having a taper which is greater than the taper of said frusto-conical flares of said two cheeks.

2. The demountable pin as claimed in claim 1, wherein the internal through bore is hexagonal.

3. The demountable pin as claimed in claim 1, wherein said frusto-conical flares are formed in the plate cheeks by a pressing operation and said plate cheeks together form a portion of another element, said plate cheeks being metal.

4. The demountable pin as claimed in claim 1, wherein the surface of the frusto-conical washer is constructed of high-strength pressed steel.

5. The demountable pin as claimed in claim 1, wherein said taper of the frusto-conical washer exceeds the taper of said flares by 2÷3 degrees.

* * * * *